Nov. 15, 1966 J. S. TROTH 3,285,468
PLASTIC BOTTLE CARRIER
Filed March 29, 1965 2 Sheets-Sheet 1
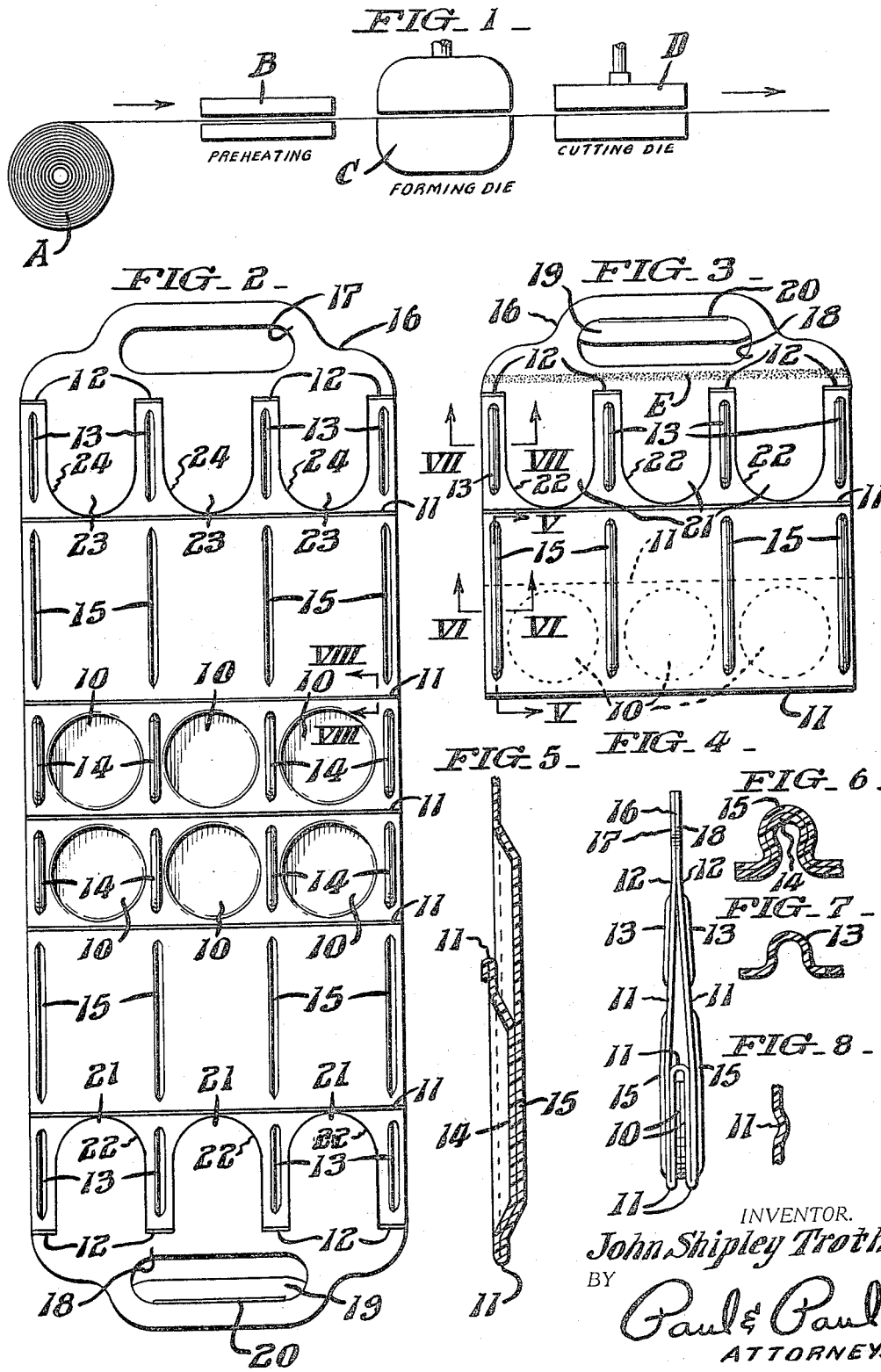
INVENTOR.
John Shipley Troth,
BY
Paul & Paul
ATTORNEYS.

Nov. 15, 1966 J. S. TROTH 3,285,468
PLASTIC BOTTLE CARRIER
Filed March 29, 1965 2 Sheets-Sheet 2
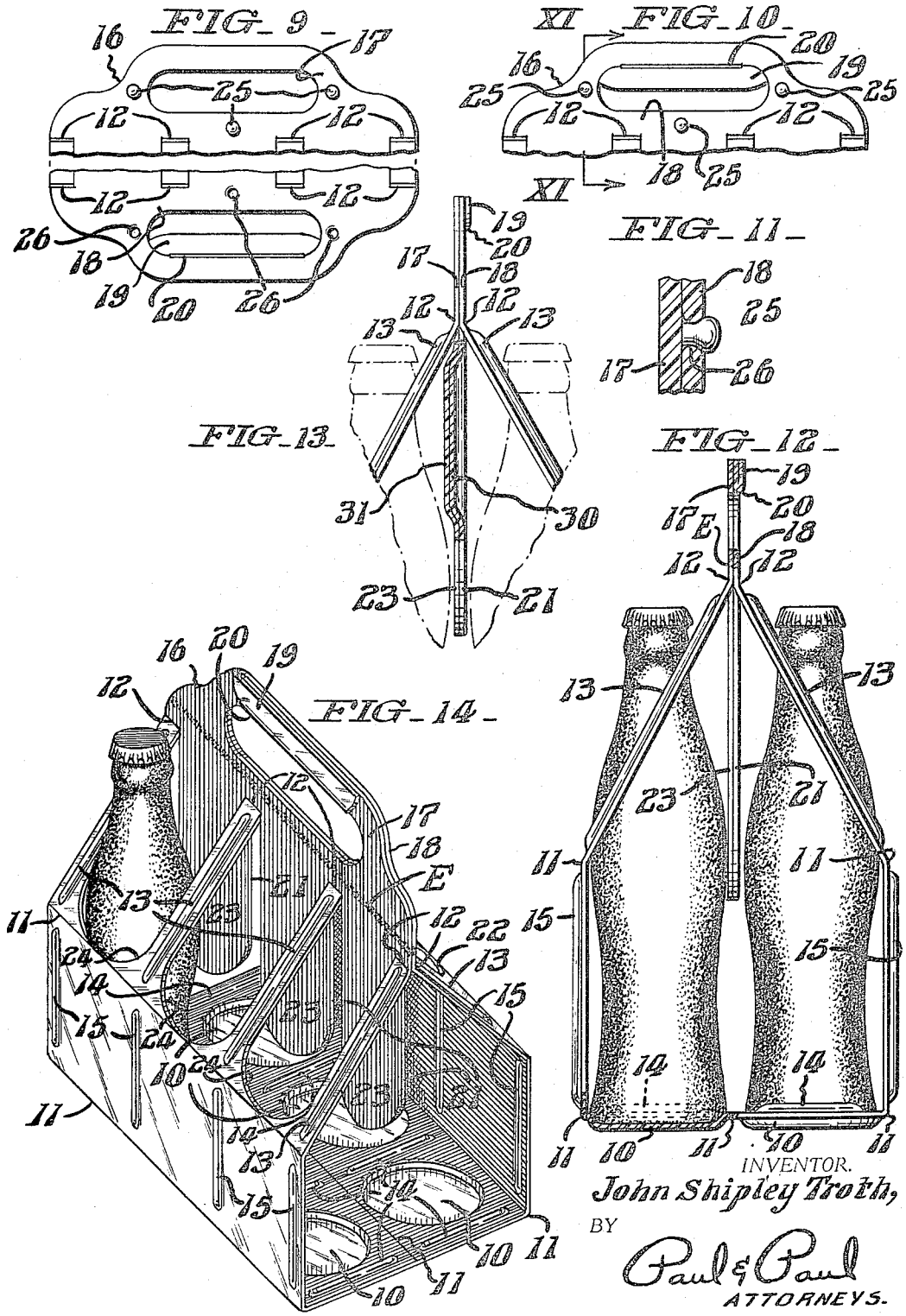
INVENTOR.
John Shipley Troth,
BY
Paul & Paul
ATTORNEYS.

United States Patent Office 3,285,468
Patented Nov. 15, 1966

3,285,468
PLASTIC BOTTLE CARRIER
John S. Troth, Box 3877, Greenville, Del.
Filed Mar. 29, 1965, Ser. No. 443,486
2 Claims. (Cl. 220—115)

This invention relates to a carrier for conveniently carrying a plurality of articles such as containers, bottles and the like which carrier is made from a single sheet of thermoplastic material hot-pressed and cut so as to be capable of being stored in a flat condition and subsequently assembled into a rigid carrier.

Collapsible carrying containers have in the past generally been constructed of paper products which needed achieving the strength required for use in carrying relatively heavy articles. It has long been desired to provide a carrying container which would have the requisite strength to be reusable and be capable of being stored and shipped in a collapsed or flat condition.

It is therefore an object of this invention to provide a carrier which can be inexpensively produced from a single sheet of thermoplastic material in such a manner as to be a rigid hand-held carrier of sufficient strength for carrying relatively heavy articles.

It is a further object of this invention to provide a thermoplastic hand-held carrier which is configured in such a manner as to be permanently stored in a flat condition or erected in a rigid condition without the use of tools of any kind.

It is a further object of this invention to provide a method for manufacturing a hand-held carrier from a single sheet of thermoplastic material by utilizing the steps of preheating the material, forming the material into the requisite configuration and cutting the material in such a manner as to provide for easy semi-permanent assembly of the article into the form of either a closed container for storage in a flat condition or an open container rigid and ready for carrying articles.

Referring now to the drawings:

FIGURE 1 is a schematic illustration of a process according to this invention for forming a hand-held carrier.

FIGURE 2 is a plan view of an unfolded carrier which has been formed and cut according to this invention.

FIGURE 3 is a side view of a carrier according to this invention which has been folded flat for storage or shipment.

FIGURE 4 is an end view of the folded carrier of FIGURE 3.

FIGURE 5 is a sectioned fragmentary view of a raised portion in FIGURE 3 taken along the lines and arrows V—V of FIGURE 3, illustrating the nesting of the base and side portions of the container within one another.

FIGURE 6 is a fragmentary cross-sectioned view taken along lines and arrows VI—VI of FIGURE 3 more clearly showing specifically how the raised portions of the container shown in FIGURES 3 and 5 hold the container in the position shown in FIGURE 4.

FIGURE 7 is a fragmentary cross-sectioned view taken along the lines and arrows VII—VII of FIGURE 3 showing a reinforcing rib formed on the carrier according to this invention.

FIGURE 8 is a fragmentary cross-sectioned view taken along the lines and arrows VIII—VIII of FIGURE 2 showing the configuration of the score lines formed in the thermoplastic sheet for folding the carrier into its various shapes.

FIGURES 9 and 10 are partial views of the handle portion of a carrier according to this invention showing one means for fastening the two halves of the handle portion together.

FIGURE 11 is a fragmentary sectioned view taken along the lines and arrows XI—XI in FIGURE 10 showing in detail one method of attaching the two handle portions to each other.

FIGURE 12 is a partially sectioned end view of the carrier according to this invention showing the rigidly erected carrier as it would appear when carrying articles such as bottles.

FIGURE 13 is a fragmentary partially sectioned view of a modification of FIGURE 12 showing another means for rigidly assemblying the container in a manner similar to the assembly of the folded container shown in FIGURE 4.

FIGURE 14 is a perspective view of an assembled carrier showing an embodiment wherein the top portion of the container is rigidly assembled by means of heat sealing.

Referring now specifically to the drawings:

The schematic illustration in FIGURE 1 shows a roll of thermoplastic base material at A which is traveled in the direction of the arrow to a preheating zone B, the rate of travel of the thermoplastic base material regulated so that material emerging from preheating zone B is sufficiently pliable to be formed by a desirably configured forming dye at C. The formed and desirably thermoplastic material is then cut into the desired shape at D. After D the remaining base material may be separated from the formed carrier sheet (not shown) which in turn can be folded and stored for shipment in any convenient manner.

The output of the process shown in FIGURE 1 is a function of the residence time necessary for the thermoplastic material to achieve a proper operating temperature for the material chosen, the dwell time for the forming and cutting steps of C and D respectively will depend upon and be synchronized with the rate of travel of the base material A.

In a preferred embodiment the carrier of this invention is formed of linear polyethylene or polypropylene sheet approximately 0.020 inch thick. These materials are illustrative of particularly successful types of thermoplastic materials chosen for use in the carrier of this invention however any thermoplastic material which may be formed into a sheet, preheated to a pliable state and subsequently formed by means of a die and subsequently cut without cracking or acquiring other undesirable characteristics are suitable for use in this invention.

For convenience of illustration the base material A is shown as a roll in FIGURE 1, however it should be understood that sheet material can work equally well. Even freshly formed base material can be used.

The preheating step at B may be accomplished by any conventional method. The heaters employed should preferrably be characterized by their ability to be accurately controlled to enable an operator of the process to synchronize the speed of the base material through the heating zone, to emit at the right hand end of the heating zone. A pliable sheet of material which has undergone no harmful deterioration and is capable of being easily formed by means of the forming die shown at C. The forming operation which takes place at C may be accomplished in any conventional manner, by receiving a thermoplastic sheet, which has been heated to its softening point, and thereafter pressing the hot pliable sheet against the contours of a mold. The required pressure may be supplied either mechanically, hydraulically, pneumatically or by vacuum. Subsequent to the forming step the newly configured thermoplastic sheet retains its new shape by cooling to a temperature below the softening point of the material. As previously described the time required for forming is less than that required for preheating therefore the speed of travel of the base material can be conventionally adjusted by means of take-up rolls and the like and the output of the process is entirely dependent upon the length of time required for the preheating step. The forming step takes but a relatively short period of time to accomplish.

FIGURE 2 is a top view of the carrier according to this invention in its unfolded state. It appears here as it would leaving the cutting step D in FIGURE 1 after it has been separated from the base material. The indentations shown at 10 are formed by the die at step C and can be designed for any type of container the carrier is designed to accommodate.

Score lines for folding are provided in the carrier blank at 11 and 12. FIGURE 8 shows a cross sectional view of the shape of the score lines after being formed in the die in step C. The score lines provide folding points about which a blank can be rigidly assembled or folded for storage as shown in FIGURES 3 and 4.

The forming step also provides the carrier blank with reinforcing ridges shown at 13 in FIGURES 2 and 3 and in cross-section in FIGURE 7.

The forming step also provides the carrier blank with male and female indentations at 14 and 15 respectively. When the carrier is folded into the shape shown in the side view in FIGURE 3, these male and female indentations 14 and 15 respectively, cooperate respectively as shown in the cross-sectioned view in FIGURES 5 and 6 to hold the carrier in a collapsed position such as that shown in FIGURES 3 and 4. Under the influence of these mating indentations the carrier when stored in a flat condition is not subjected to popping open thereby preventing a storage or handling problem as is sometimes encountered in carriers made from paper products.

The cutting step D finishes off the carrier blank shown in FIGURE 2 by forming the general outline of the carrier as shown by the border line 16. It also makes a complete cut-out in the handle portion 17 and a partial cut-out in the handle portion 18 so as to provide flap 19 which is hinged about the score line 20. When the two handle portions 17 and 18 are brought together the flap portion 19 may be inserted through the hole in handle portion 17, and folded about its score line to thereby rigidly connect the two handle portions together to provide a means for easily hand carrying the carrier article.

The cutting step D further provides the carrier blank with the cuts shown at 22 which join with the score lines 12 to provide a downwardly depending partition portion 21 from handle 18 and partition 23 formed by cut lines 24 depending from handle 17.

When assemblying the carrier blank to form a rigid carrier for containers and the like, such as shown in FIGURE 14, a number of different means may be employed for keeping the container in a rigid upright position. The previously described flap 19 may be folded over to hold the two handle portions together and the container will remain rigid in use to prevent it from collapsing. The reinforcing ribs 15 give the container an unusual lateral stability which prevents the carrier from twisting out of shape if the load placed in it is unbalanced as for example when carrying both empty and full containers.

In another embodiment the carrier can be provided with a permanently fixed handle portion by the simple expedient of heat sealing the two halves of the handle portion together in the area shown at E.

FIGURES 9 and 10 illustrate how in another embodiment of this invention dimples 25 and recesses or holes 26 may be formed in the handle portion 17 and 18 respectively such that when the two portions are brought together as shown in FIGURE 10 the dimple portion 25 on handle 17 will project through the handle portion 18 as shown in FIGURE 11 forming a joined assembly.

Still another modification according to this invention may be achieved by providing the partition portions 21 and 23 with male and female recesses 30 and 31 respectfully similar in shape to 14 and 15 such that when the partitions are snapped together they form unitary rigid walls which hold the handle portions 17 and 18 together as well as providing unusual rigidity to the carrier. The manner of joining the two partitions together with male and female recesses 30 and 31 can be seen in the partial cross-section view in FIGURE 13.

When viewing the assembled container from the end as shown in FIGURE 12 the female recess 15 is shown fulfilling its dual function as a reinforcing member similar to rib ridge 13. These ridges 13, 15 and 14 of FIGURE 12 cooperate with the recesses 10, the partitions 21 and 23 and the handle portions 17 and 18 to form an unusually strong rigid structure formed of a remarkably thin thermoplastic sheet.

While this invention has been described with reference to particular embodiments thereof it will be appreciated by one skilled in the art that equivalent arrangements of structure and equivalent methods of manufacture may be employed in the practice of this invention without departing from the spirit of the invention as described herein or from the scope of the appended claims.

I claim:

1. A carrier for articles made up of an elongated, generally rectangular sheet of thermoplastic material which is hot-pressed to form lateral fold lines about which the carrier may be folded, the lines defining a base portion, side walls and top extensions of the side walls the extensions being cut and folded so as to be configured with registering handle portions and article receiving voids and having depending therefrom partitions for separating articles in the carrier, reinforcing ridges, omega-shaped in cross section formed in the side walls and in the top extensions of the side walls, omega-shaped ridges disposed on the base portion positioned to be received in the omega-shaped ridges in the side walls when the carrier is folded flat for retaining the carrier in a folded flat condition for shipment and storage.

2. The carrier of claim 1 further characterized by omega-shaped ridges formed in at least two opposed depending partitions positioned for pressure fit nesting engagement with each other for providing rigidity to the carrier.

References Cited by the Examiner

UNITED STATES PATENTS

| | | | |
|---|---|---|---|
| 966,258 | 8/1910 | Sochurek. | |
| 2,302,677 | 11/1942 | Crane | 220—112 |
| 2,568,436 | 9/1951 | Faria | 220—105 |
| 2,804,234 | 8/1957 | Lachance | 220—116 |
| 2,858,224 | 10/1958 | Darrah | 229—2.5 X |
| 2,998,899 | 9/1961 | Telesca | 220—102 |
| 3,039,651 | 6/1962 | Lang | 220—110 |
| 3,171,562 | 3/1965 | Weiss | 229—2.5 X |
| 3,192,681 | 7/1965 | Greenbaum | 229—2.5 X |
| 3,212,907 | 10/1965 | Caprioli | 229—2.5 X |

GEORGE O. RALSTON, *Primary Examiner*,